July 17, 1956  L. E. GREGG ET AL  2,754,681
REPEATED FLEXURE TESTING MACHINE
Filed Aug. 21, 1953  4 Sheets-Sheet 1

INVENTORS
L. E. GREGG, K. O. LANGE
W. H. ALCOKE, J. H. HAVENS
BY
W. A. Fraser

July 17, 1956  L. E. GREGG ET AL  2,754,681
REPEATED FLEXURE TESTING MACHINE
Filed Aug. 21, 1953  4 Sheets-Sheet 3

INVENTORS
L. E. GREGG, K. O. LANGE
W. H. ALCOKE, J. H. HAVENS
BY
W. G. Fraser

July 17, 1956     L. E. GREGG ET AL     2,754,681
REPEATED FLEXURE TESTING MACHINE
Filed Aug. 21, 1953     4 Sheets-Sheet 4

INVENTOR.
L-E-GREGG, K-O-LANGE
BY W-H-ALCOKE, J-H-HAVENS
W. G. Fraser

United States Patent Office 2,754,681
Patented July 17, 1956

2,754,681

REPEATED FLEXURE TESTING MACHINE

Lowell E. Gregg, Karl O. Lange, William H. Alcoke, and James H. Havens, Lexington, Ky., assignors to The Firestone Tire & Rubber Company, Akron, Ohio, a corporation of Ohio Application August 21, 1953, Serial No. 375,603

4 Claims. (Cl. 73—100)

This invention relates to fatigue testing machines and more particularly to a machine adapted to test the fatigue properties of paving material.

It has long been desirable to find a laboratory test which would accurately predict the performance of paving materials in service. This is particularly true with respect to the testing of flexible pavements such as conventional bituminous pavements and bituminous pavements having rubber as an essential ingredient. In the absence of such a testing machine and such a test, experimental sections of pavement must be laid down and observed and checked under actual traffic conditions in order to determine the properties and the useful life of the pavement. Such a full scale test program is obviously time consuming and expensive.

The present invention solves this difficulty by providing a testing machine which is capable of subjecting large sections of pavement to repeated bending cycles to produce alternating compression and tension stresses in the pavement, thus simulating accurately the loads imposed on the pavement by traffic. The machine comprises an oscillating hinged table which is so constructed so as to hold large specimens of paving material and bending the specimens repeatedly until failure occurs. The machine has the advantage of adjustability so that the loads and the deflections imposed upon the specimens can be controlled. The results obtained by the use of such a fatigue testing machine have been found to be useful in predicting the performance of pavement in actual service.

It is, therefore, a primary object of the present invention to provide a machine capable of stressing sections of pavement in a manner closely approximately actual service conditions whereby the pavement may be accurately appraised and its performance in service predicted.

A more specific object is to provide a testing machine adapted to subject sections of pavement to a controlled and adjustable deflection.

Another object is to provide such a machine which is simple and rugged in construction, which is easy to operate and which will give accurate and reliable test results.

Further objects and advantages will be more fully apparent from the following description of a preferred form of the invention, reference being had to the accompanying drawings in which.

Figure 1:
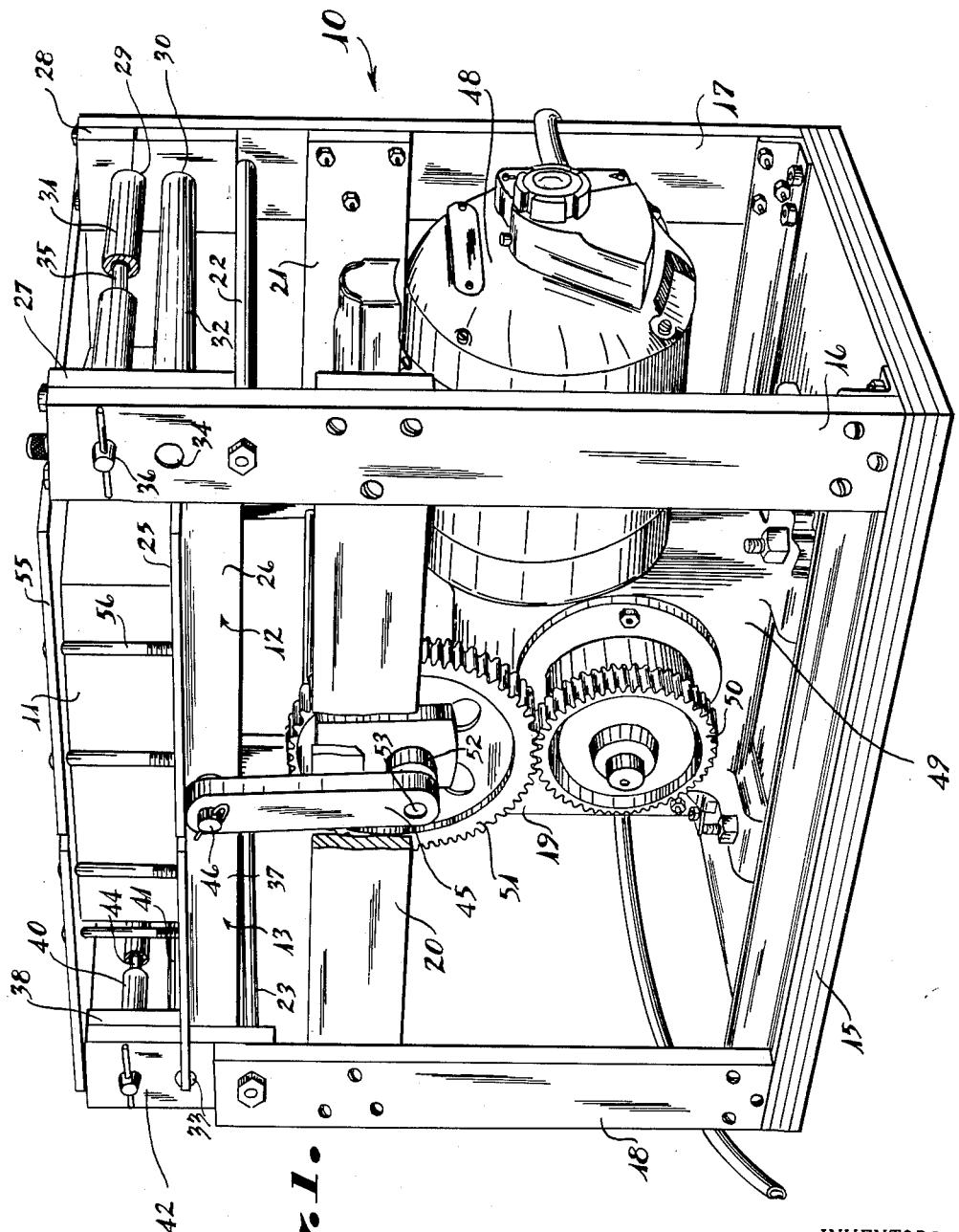
Figure 1 is a perspective view of a fatigue testing machine embodying the invention, with parts being broken away to show details of construction.

The invention is embodied in apparatus which, as mentioned above, is adapted to subject sections of flexible pavement to repeated bending stresses. In its preferred form the apparatus comprises a work supporting table indicated generally at 10 which is adapted to receive and hold test specimens of paving material 11. The table comprises two sections 12 and 13 which are supported for limited movement with respect to each other, the sections being hinged at their outside ends and being pivotally connected at their inner ends in such a manner that the inner ends, at the center of the table, can be given a vertical reciprocating movement. The sections of pavement 11 are of such length as to span both sections of the table and when the center of the table is given the reciprocating vertical movement the test specimens will undergo the desired bending.

It will be obvious that the essential features of the invention may be embodied in many different constructions. In the described form the table sections 12 and 13 and the associated parts are supported by a framework comprising a base 15 and four upright columns indicated at 16–19 inclusive. Longitudinal structural members 20 and 21 extending from 16 to 18 and from 17 to 19 respectively serve to brace the framework in the longitudinal direction, while bolts 22 and 23 give added stiffness in the lateral direction. These structural members comprising the frame may either be welded or secured together by nuts and bolts as illustrated.

The table sections 12 and 13 are substantially identical. Referring first to section 12, it will be seen that the section comprises a flat plate 25 forming a bed to which the specimens 11 can be clamped. Depending downwardly from plate 25 are the vertical flanges 26 which are integral with or secured to a pair of end members 27 and 28 which extend upwardly above the plate 25. Preferably the plate 25, the flanges 26 and the blocks 27 and 28 are welded together to form a strong integral part.

The members 27 and 28 are bored as at 29 and 30 to receive sleeves or tubes 31 and 32 which extend between the members as shown. This sleeve construction constitutes one part of the hinge support by which table section 12 is suspended from the frame. The hingle is completed by a hinge rod 35 adapted to extend through one of the sleeves 31 or 32 between columns 16 and 17, the columns having pairs of aligned holes 33 and 34 through which the hinge rod extends. The hinge rod 35 has threaded ends adapted to receive nuts 36, which secure the rod to the frame. The nuts may be readily removed and the hinge rod changed in position to pass through either of the sleeves 31 or 32. It will be apparent that by this construction, table section 12 can swing freely around hinge rod 35.

Figure 3:
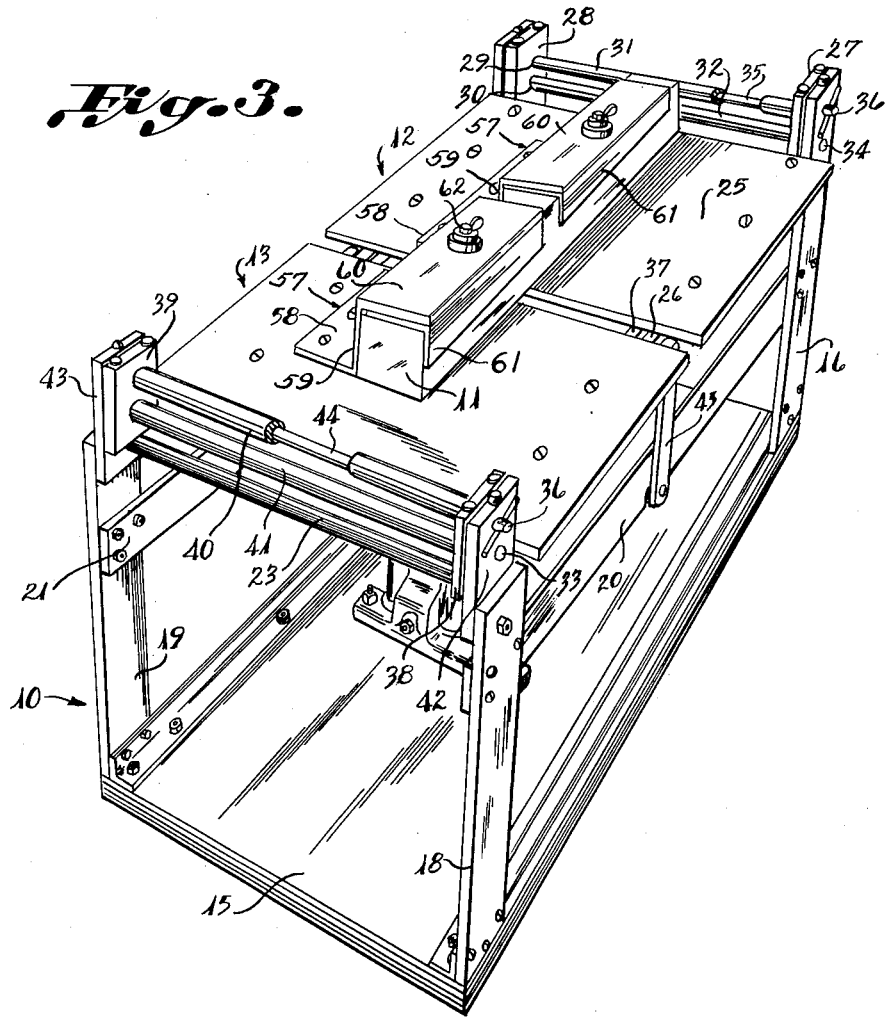
Figure 3 is a perspective view of the machine of Figure 1 taken at an angle to show the top of the machine, and showing an alternate means of clamping the pavement test specimens to the table.
Figure 4:
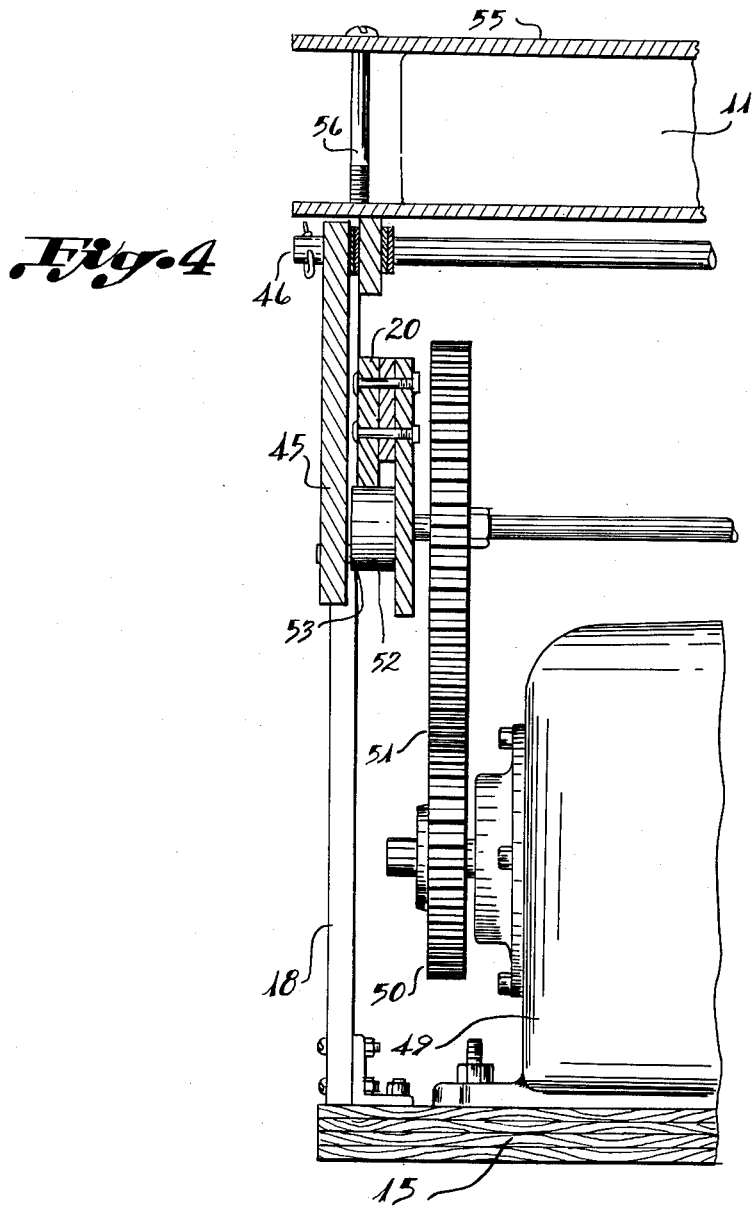
Figure 4 is a vertical section taken in the plane indicated by the lines 4—4 in Figure 2.

The other table section 13 differs from section 12 in that its vertical flange indicated at 37 is inset slightly so that it will slightly overlap flange 26 at the center of the table, see Figures 3 and 4. Likewise, the end members 38 and 39 of the section 13 and the sleeves 40 and 41 extending between them are similar to the structure already described for section 12, differing only in that blocks 38 and 39 are spaced closer together than blocks 27 and 28.

The section 13 is not supported directly by the standards 18 and 19 but rather is hinged to members 42 and 43 by means of a hinge rod 44 in a manner similar to that previously described for section 12. As will be seen later, the members 42 and 43 are pivotally mounted on tie bolt 23 so that the outer end of the section 13 can move inwardly during the operation of the table.

Oscillating movement is given to the table sections 11 and 12 by an articulating arm 45 which is connected to the table sections by a rod 46 extending through holes in the vertical overlapping portions of flanges 26 and 37. The articulating arm 45 is given a limited vertical reciprocating movement by the drive mechanism shown beneath the table 10 which comprises an electric motor 48, a speed reducer 49 and the gears 50 and 51. The oscillating arm 45 is driven by gear 51 by means of a crank arm 52 secured to the jack shaft supporting the gear 51, arm 45 being connected to the crank by a pin 53 having the eccentricity required to give the arm its reciprocating movement. It may be desired from time to time to vary this eccentricity and thus the working stroke of arm 45 so that the table will impart the desired deflection to the pavement sections 11.

Figure 2:
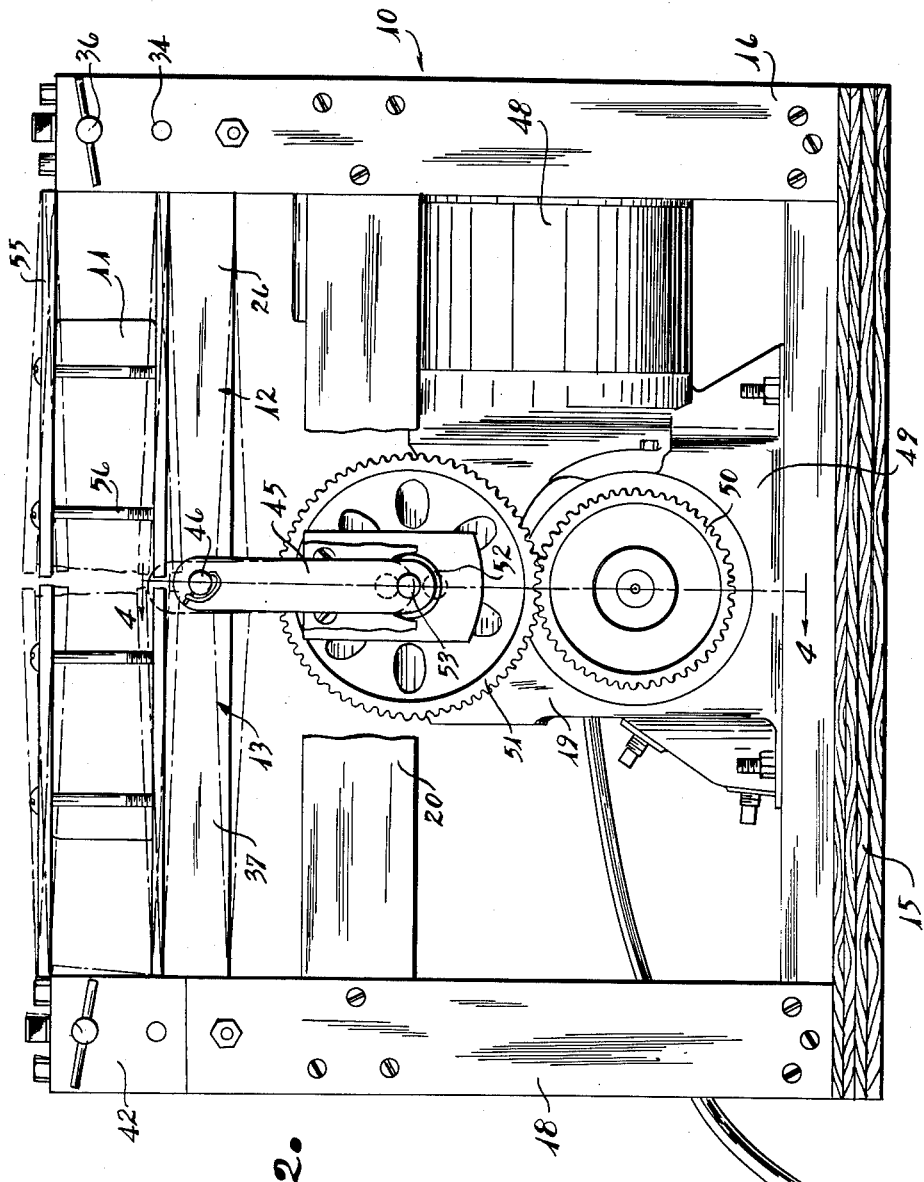
Figure 2 is a front elevation of the machine of Figure 1 showing in dotted lines the extent of oscillation of the specimen-supporting table and the resultant deflection of the test specimens of pavement.

In use, the apparatus is adjusted so that the table sections 12 and 13 lie in the same horizontal plane. In this position the inner ends of the sections are almost abutting. The pavement specimens 11 are placed upon the table with the center line of the specimen overlying the center of the table, i. e. overlying the joint between the sections 12 and 13, and are then clamped in position by means of a top plate 55 and a plurality of bolts 56 which extend through the top plate and engage suitable threaded holes in the plate sections 25 and 37. For most tests it is desirable to insert sheets of waxed paper lubricated with petroleum jelly between the pavement specimens and the clamping plates so that the specimen will be free of any longitudinal forces which might otherwise be exerted upon the specimen. The motor 48 is then started and the arm 45 causes the table sections to swing about their central hinge 46 and about their end hinges 35 and 44, the full extent of the swinging movement being indicated by the dotted lines in Figure 2. It should be noted that when the table sections take either one of the dotted line positions shown on Figure 2, it is necessary for the outer end of section 13 and for the members 42 and 43 to swing inwardly to the position also shown in dotted lines in Figure 2. In testing bituminous pavement it is desirable to impart an oscillation of about 26 strokes per minute to the table and it is also desirable that the eccentricity of the crank be such as to give the arm 45 a working stroke of about ⅛ in. to ½ in.

In the present example the table sections are shown hinged at their upper sleeves 31 and 40, which are shown to be located in the plane of the neutral axis of the pavement specimen. The result is that, as the pavement specimen is flexed, the specimen is subjected to alternate tension and compression. If the hinge rods are dropped to extend through the lower sleeves 32 and 41 the hinging action will take place about axes which lie in the same plane as the top surface of the table, that is at the bottom of the pavement specimens with the result that as the flexing of the pavement occurs the pavement is subjected only to repeated tension with little or no compression occurring in the specimens. These two positions are most useful in conducting the tests. Suitable devices are disposed on the machine suitable to count the number of bending cycles to which the section of pavement is subjected before failure occurs, the number of cycles which the pavement can withstand being a reliable indication of the performance of the pavement in service.

In Figure 4, the apparatus illustrated is generally identical with that already described, the only difference lying in the particular means used to clamp the specimens to the table. This clamping means comprises two rigid Z-shaped members 57 secured respectively to the table sections 12 and 13 and each comprising a bottom flange, 58, a vertical flange 59 and a horizontal top flange 60 adapted to overhang the pavement specimens 11. An angular shaped cap 61 fits over the specimen 11 and partially confines it in the manner shown. The specimen 11 is clamped to the table by the threaded screws 62 which extend through threaded holes in the top flanges 60 and which as they are turned inwardly, exert pressure upon the caps 61.

Various modifications and improvements will be apparent to those skilled in the art without departing from the spirit and scope of the invention, the various features of which are summarized in the appended claims.

We claim:

1. A testing machine for subjecting a specimen of pavement and the like to repeated bending stresses, comprising a table comprising two sections having their inner ends hinged together at an axis at the center of the table, said sections being hinged about axes at their outer ends respectively to a supporting framework and at least one of said sections being hinged for limited bodily movement toward the center of said table, means to clamp said specimen to said table in a position spanning the center of said table and means to give said table a vertically reciprocating movement of predetermined constant amplitude at said central axis whereby to bend said sepcimen about said central axis.

2. A testing machine for subjecting a specimen of pavement and the like to repeated bending stresses comprising a framework including a base, upright columns rising from the corners of said base, a table adapted to support said specimen, means to clamp said specimen to said table, said table being divided into two sections along a central axis with said sections being hinged together along said axis, said sections being pivotally mounted at their outer ends along axes extending between each pair of end columns respectively, means permitting at least one of said outer end axes to move bodily toward said central axis and means to impart a vertical reciprocating motion to said central axis of predetermined constant amplitude said means including a gear, a crank secured to said gear and an arm pivotally connected to said crank and to said sections at said central axis.

3. The testing machine of claim 2 in which said means permitting at least one of said outer end axes to move bodily toward said central axis comprises a pair of members supporting said one outer axis, said members being pivotally mounted respectively on the adjacent pair of said columns.

4. The testing machine of claim 2 in which each of said sections has a plurality of parallel tubes extending parallel to said central axis, a hinge rod extending between each pair of end columns and selectively moveable to distinct vertical positions along the respective columns passing through a selected one of said tubes whereby to vary the bending stresses in said specimen.

References Cited in the file of this patent

UNITED STATES PATENTS

| | | |
|---|---|---|
| 1,906,340 | Scott | May 2, 1933 |
| 1,920,039 | Thwing | July 25, 1933 |
| 2,188,853 | Buckwalter | Jan. 30, 1940 |
| 2,462,826 | Waard | Feb. 22, 1949 |
| 2,486,567 | Lazan | Nov. 1, 1949 |
| 2,514,202 | Prettyman | July 4, 1950 |